(12) United States Patent
Armbruster et al.

(10) Patent No.: US 10,236,654 B2
(45) Date of Patent: Mar. 19, 2019

(54) MARKING APPARATUS WITH AT LEAST ONE GAS LASER AND HEAT DISSIPATOR

(75) Inventors: Kevin L. Armbruster, Chicopee, MA (US); Brad D. Gilmartin, Gardner, MA (US); Peter J. Kueckendahl, Bad Oldesloe (DE); Bernard J. Richard, Dudley, MA (US); Daniel J. Ryan, Sycamore, IL (US)

(73) Assignee: ALLTEC ANGEWANDTE LASERLIGHT TECHNOLOGIE GMBH, Selmsdorf (DE)

( * ) Notice: Subject to any disclaimer, the term of this patent is extended or adjusted under 35 U.S.C. 154(b) by 405 days.

(21) Appl. No.: 14/342,505

(22) PCT Filed: Jul. 19, 2012

(86) PCT No.: PCT/EP2012/003071
§ 371 (c)(1),
(2), (4) Date: Mar. 3, 2014

(87) PCT Pub. No.: WO2013/034216
PCT Pub. Date: Mar. 14, 2013

(65) Prior Publication Data
US 2014/0209580 A1    Jul. 31, 2014

(30) Foreign Application Priority Data

Sep. 5, 2011 (EP) ..................... 11007187

(51) Int. Cl.
*H01S 3/02*   (2006.01)
*H01S 3/04*   (2006.01)
(Continued)

(52) U.S. Cl.
CPC ............ *H01S 3/0407* (2013.01); *B23K 26/06* (2013.01); *B23K 26/355* (2018.08);
(Continued)

(58) Field of Classification Search
CPC .......... H01S 3/04; H01S 3/0407; H01S 3/076; H01S 3/08; H01S 3/083; B23K 26/14; B23K 26/36; G02B 26/10
(Continued)

(56) References Cited

U.S. PATENT DOCUMENTS 2,359,780 A    10/1944  Glenn
3,465,358 A     9/1969  Bridges
(Continued)

FOREIGN PATENT DOCUMENTS

DE    4029187 A1    3/1992
DE    4212390 A1   10/1993
(Continued)

OTHER PUBLICATIONS

U.S. Appl. No. 14/342,510, Office Action dated Aug. 1, 2014.
(Continued)

*Primary Examiner* — Tu B Hoang
*Assistant Examiner* — Erin E McGrath
(74) *Attorney, Agent, or Firm* — Hoffman Warnick LLC

(57) ABSTRACT

The invention relates to a marking apparatus for marking an object with laser light, which apparatus comprises at least one gas laser for emitting at least one laser beam for marking the object. The at least one gas laser comprises a plurality of resonator tubes (12) for receiving a laser gas, a plurality of heat dissipaters (20) for dissipating heat from the resonator tubes (12) is provided, each resonator tube (12) is thermally connected to one of the heat dissipaters (20), and each heat dissipater (20) comprises microchannels for receiving a cooling fluid.

6 Claims, 6 Drawing Sheets

(51) Int. Cl.
*B23K 26/06* (2014.01)
*H01S 3/07* (2006.01)
*H01S 3/041* (2006.01)
*H01S 3/038* (2006.01)
*B23K 26/364* (2014.01)
*B23K 26/361* (2014.01)
*B23K 26/352* (2014.01)
*H01S 3/08* (2006.01)
*H01S 3/083* (2006.01)
*H01S 3/23* (2006.01)
*H01S 3/00* (2006.01)
*H01S 3/03* (2006.01)

(52) U.S. Cl.
CPC .......... *B23K 26/361* (2015.10); *B23K 26/364* (2015.10); *H01S 3/0385* (2013.01); *H01S 3/041* (2013.01); *H01S 3/076* (2013.01); *H01S 3/005* (2013.01); *H01S 3/03* (2013.01); *H01S 3/0835* (2013.01); *H01S 3/08059* (2013.01); *H01S 3/2383* (2013.01)

(58) Field of Classification Search
USPC ........................................ 219/121.68, 121.76
See application file for complete search history.

(56) References Cited

U.S. PATENT DOCUMENTS

| | | | |
|---|---|---|---|
| 3,533,012 A | 10/1970 | Johnson et al. | |
| 3,564,449 A | 2/1971 | Muller et al. | |
| 3,564,452 A | 2/1971 | Rempel | |
| 3,596,202 A | 7/1971 | Patel | |
| 3,602,837 A | 8/1971 | Goldsborough | |
| 3,609,584 A | 9/1971 | Stitch et al. | |
| 3,628,175 A | 12/1971 | Dane | |
| 3,638,137 A | 1/1972 | Krupke | |
| 3,646,476 A | 2/1972 | Barker et al. | |
| 3,670,259 A * | 6/1972 | Young | H01S 3/083 372/12 |
| 3,705,999 A | 12/1972 | Hermann et al. | |
| 3,721,915 A | 3/1973 | Reilly | |
| 3,801,929 A | 4/1974 | Kawasaki | |
| 3,851,272 A | 11/1974 | Shull et al. | |
| 3,900,804 A | 8/1975 | Davis et al. | |
| 3,919,663 A | 11/1975 | Caruolo et al. | |
| 3,946,233 A | 3/1976 | Erben et al. | |
| 4,053,851 A | 10/1977 | Krupke | |
| 4,122,853 A | 10/1978 | Smith | |
| 4,125,755 A | 11/1978 | Plamquist | |
| 4,131,782 A | 12/1978 | Einstein et al. | |
| 4,170,405 A | 10/1979 | Sziklas | |
| 4,189,687 A | 2/1980 | Wieder et al. | |
| 4,270,845 A | 6/1981 | Takizawa et al. | |
| 4,376,496 A | 3/1983 | Sedam et al. | |
| 4,376,946 A | 3/1983 | Sedam et al. | |
| 4,404,571 A | 9/1983 | Kitamura | |
| 4,467,334 A | 8/1984 | Anzai | |
| 4,477,907 A | 10/1984 | McMahan | |
| 4,500,996 A | 2/1985 | Sasnett et al. | |
| 4,500,998 A | 2/1985 | Kuwabaraet et al. | |
| 4,512,639 A | 4/1985 | Roberts et al. | |
| 4,554,666 A | 11/1985 | Altman | |
| 4,596,018 A | 6/1986 | Gruber et al. | |
| 4,614,913 A | 9/1986 | Honeycutt et al. | |
| 4,652,722 A | 3/1987 | Stone et al. | |
| 4,655,547 A | 4/1987 | Heritage et al. | |
| 4,660,209 A | 4/1987 | Osada et al. | |
| 4,665,607 A | 5/1987 | Ressencourt | |
| 4,672,620 A | 6/1987 | Slusher et al. | |
| 4,689,467 A | 8/1987 | Inoue | |
| 4,720,618 A | 1/1988 | Stamer et al. | |
| 4,727,235 A | 2/1988 | Stamer et al. | |
| 4,744,090 A | 5/1988 | Freiberg | |
| 4,770,482 A | 9/1988 | Sweeney et al. | |
| 4,779,278 A | 10/1988 | McKinney | |
| 4,819,246 A | 4/1989 | Aiello et al. | |
| 4,831,333 A | 5/1989 | Welch | |
| 4,845,716 A | 7/1989 | Poehler et al. | |
| 4,846,550 A | 7/1989 | Schuma et al. | |
| 4,856,007 A | 8/1989 | Weiss | |
| 4,858,240 A | 8/1989 | Pohler et al. | |
| 4,907,240 A | 3/1990 | Klingel | |
| 4,912,718 A | 3/1990 | Klingel | |
| 4,953,176 A | 8/1990 | Ekstrand | |
| 4,958,900 A | 9/1990 | Ortiz, Jr. | |
| 4,991,149 A | 2/1991 | Maccabee | |
| 5,001,718 A | 3/1991 | Burrows et al. | |
| 5,012,259 A | 4/1991 | Hattori et al. | |
| 5,023,886 A | 6/1991 | Hobart et al. | |
| 5,052,017 A | 9/1991 | Hobart et al. | |
| 5,065,405 A | 11/1991 | Laakmann et al. | |
| 5,097,481 A | 3/1992 | Fritzsche et al. | |
| 5,109,149 A | 4/1992 | Leung | |
| 5,115,446 A | 5/1992 | Von Borstel et al. | |
| 5,162,940 A | 11/1992 | Brandelik | |
| 5,199,042 A | 3/1993 | Papetti et al. | |
| 5,214,658 A | 5/1993 | Ostler | |
| 5,229,573 A | 7/1993 | Stone et al. | |
| 5,229,574 A | 7/1993 | Stone | |
| 5,268,921 A | 12/1993 | McLellan | |
| 5,274,661 A | 12/1993 | von Gunten et al. | |
| 5,294,774 A | 3/1994 | Stone | |
| 5,337,325 A | 8/1994 | Hwang | |
| 5,339,737 A | 8/1994 | Lewis et al. | |
| 5,386,427 A | 1/1995 | Zayhowski | |
| 5,386,431 A * | 1/1995 | Tulip | H01S 3/2383 359/346 |
| 5,422,906 A | 6/1995 | Hidehiko et al. | |
| 5,426,659 A | 6/1995 | Sugiyama et al. | |
| 5,431,199 A | 7/1995 | Benjay et al. | |
| 5,504,763 A | 4/1996 | Bischel et al. | |
| 5,506,858 A | 4/1996 | Takenaka et al. | |
| 5,544,186 A | 8/1996 | Sauer et al. | |
| 5,550,853 A | 8/1996 | Ostler | |
| 5,568,306 A | 10/1996 | Mandel | |
| 5,572,538 A | 11/1996 | Saitoh et al. | |
| 5,592,504 A | 1/1997 | Cameron | |
| 5,596,594 A | 1/1997 | Egawa | |
| RE35,446 E | 2/1997 | Stone | |
| 5,608,754 A | 3/1997 | Murakami et al. | |
| 5,646,907 A | 7/1997 | Maccabee | |
| 5,653,900 A | 8/1997 | Clement et al. | |
| 5,659,561 A | 8/1997 | Torruellas et al. | |
| 5,670,064 A | 9/1997 | Nakata | |
| 5,682,262 A | 10/1997 | Wefers et al. | |
| 5,689,363 A | 11/1997 | Dane et al. | |
| 5,706,305 A | 1/1998 | Yamane et al. | |
| 5,720,894 A | 2/1998 | Neev et al. | |
| 5,729,568 A | 3/1998 | Opower et al. | |
| 5,767,477 A | 6/1998 | Sutter, Jr. | |
| 5,808,268 A | 9/1998 | Balz et al. | |
| 5,815,523 A | 9/1998 | Morris | |
| 5,837,962 A | 11/1998 | Overbeck | |
| 5,864,430 A | 1/1999 | Dickey et al. | |
| 5,884,588 A | 3/1999 | Ap et al. | |
| 5,929,337 A | 7/1999 | Collins et al. | |
| 5,982,803 A | 11/1999 | Sukhman et al. | |
| 6,050,486 A | 4/2000 | French et al. | |
| 6,057,871 A | 5/2000 | Peterson | |
| 6,064,034 A | 5/2000 | Rieck | |
| 6,069,843 A | 5/2000 | DiMarzio et al. | |
| 6,122,562 A | 9/2000 | Kinney et al. | |
| 6,141,030 A | 10/2000 | Fujita et al. | |
| 6,180,913 B1 | 1/2001 | Kolmeder et al. | |
| 6,181,728 B1 | 1/2001 | Cordingley et al. | |
| 6,192,061 B1 | 2/2001 | Hart et al. | |
| 6,210,401 B1 | 4/2001 | Lai | |
| 6,229,940 B1 | 5/2001 | Rice et al. | |
| 6,256,121 B1 | 7/2001 | Lizotte et al. | |
| 6,263,007 B1 | 7/2001 | Tang | |
| 6,269,111 B1 | 7/2001 | Mori et al. | |
| 6,303,930 B1 | 10/2001 | Hagiwara | |
| 6,310,701 B1 | 10/2001 | Lizotte | |

(56) References Cited

U.S. PATENT DOCUMENTS

| | | | |
|---|---|---|---|
| 6,313,957 B1 | 11/2001 | Heemstra et al. | |
| 6,341,042 B1 | 1/2002 | Matsunaka et al. | |
| 6,356,575 B1 | 3/2002 | Fukumoto | |
| 6,370,884 B1 | 4/2002 | Kelada | |
| 6,420,675 B1 | 7/2002 | Lizotte et al. | |
| 6,421,159 B1 | 7/2002 | Sutter et al. | |
| 6,476,350 B1 | 11/2002 | Grandjean et al. | |
| 6,495,795 B2 | 12/2002 | Gortler et al. | |
| 6,512,781 B1 | 1/2003 | Borstel et al. | |
| 6,539,045 B1 | 3/2003 | Von Borstel et al. | |
| 6,621,838 B2 | 9/2003 | Naito et al. | |
| 6,661,568 B2 | 12/2003 | Hollemann et al. | |
| 6,690,702 B1 | 2/2004 | Ohmi et al. | |
| 6,693,930 B1 | 2/2004 | Chuang et al. | |
| 6,768,765 B1 | 7/2004 | Schroeder et al. | |
| 6,791,592 B2 | 9/2004 | Assa et al. | |
| 6,829,000 B2 | 12/2004 | Assa et al. | |
| 6,856,509 B2 | 2/2005 | Lin | |
| 6,861,614 B1 | 3/2005 | Tanabe et al. | |
| 6,898,216 B1 | 5/2005 | Kleinschmidt | |
| 6,915,654 B2 | 7/2005 | Johnson | |
| 6,944,201 B2 | 9/2005 | Bunting et al. | |
| 7,046,267 B2 | 5/2006 | Franklin et al. | |
| 7,058,100 B2 | 6/2006 | Vetrovec et al. | |
| 7,167,194 B2 | 1/2007 | Assa et al. | |
| 7,170,251 B2 | 1/2007 | Huang | |
| 7,190,144 B2 | 3/2007 | Huang | |
| 7,200,464 B2 | 4/2007 | Nussbaum et al. | |
| 7,291,999 B2 | 11/2007 | Huang | |
| 7,331,512 B2 | 2/2008 | Caiger | |
| 7,334,744 B1 | 2/2008 | Dawson | |
| 7,346,427 B2 | 3/2008 | Hillam et al. | |
| 7,394,479 B2 | 7/2008 | Assa et al. | |
| 7,421,308 B2 | 9/2008 | Nussbaum et al. | |
| 7,496,831 B2 | 2/2009 | Dutta et al. | |
| 7,521,649 B2 | 4/2009 | Umetsu et al. | |
| 7,521,651 B2 | 4/2009 | Gross et al. | |
| 7,543,912 B2 | 6/2009 | Anderson et al. | |
| 7,565,705 B2 | 7/2009 | Elkins et al. | |
| 8,164,025 B1 | 4/2012 | Kunas et al. | |
| 8,168,921 B1 | 5/2012 | Kunas et al. | |
| 8,212,178 B1 | 7/2012 | Kunas et al. | |
| 8,263,898 B2 | 9/2012 | Alber | |
| 2001/0030983 A1 | 10/2001 | Yuri et al. | |
| 2001/0045418 A1 | 11/2001 | Brandinger et al. | |
| 2002/0021730 A1 | 2/2002 | Schroeder et al. | |
| 2002/0071466 A1 | 6/2002 | Zeller | |
| 2002/0080845 A1 | 6/2002 | Schulz et al. | |
| 2002/0114362 A1 | 8/2002 | Vogler et al. | |
| 2002/0162825 A1 | 11/2002 | Lizotte et al. | |
| 2002/0196534 A1 | 12/2002 | Lizotte et al. | |
| 2003/0010420 A1 | 1/2003 | Morrow | |
| 2003/0014895 A1 | 1/2003 | Lizotte | |
| 2003/0019854 A1 | 1/2003 | Gross et al. | |
| 2003/0123040 A1 | 7/2003 | Almogy | |
| 2003/0147443 A1 | 8/2003 | Backus | |
| 2003/0168434 A1 | 9/2003 | Gross et al. | |
| 2003/0174741 A1 | 9/2003 | Weingarten et al. | |
| 2003/0219056 A1 | 11/2003 | Yager et al. | |
| 2003/0219094 A1 | 11/2003 | Basting et al. | |
| 2004/0021054 A1 | 2/2004 | Bennett | |
| 2004/0027630 A1 | 2/2004 | Lizotte | |
| 2004/0028108 A1 | 2/2004 | Govorkov et al. | |
| 2004/0066825 A1 | 4/2004 | Hayashikawa et al. | |
| 2004/0104270 A1 | 6/2004 | Acosta | |
| 2004/0119979 A1 | 6/2004 | Duarte et al. | |
| 2004/0179570 A1 | 9/2004 | Virtuk et al. | |
| 2004/0202220 A1 | 10/2004 | Hua et al. | |
| 2004/0228004 A1 | 11/2004 | Sercel et al. | |
| 2004/0232125 A1 | 11/2004 | Clauer et al. | |
| 2005/0013328 A1 | 1/2005 | Jurgensen | |
| 2005/0056626 A1 | 3/2005 | Gross et al. | |
| 2005/0059265 A1 | 3/2005 | Im | |
| 2005/0068538 A1 | 3/2005 | Rao et al. | |
| 2005/0092722 A1 | 5/2005 | Dane et al. | |
| 2005/0094684 A1 | 5/2005 | Hermann et al. | |
| 2005/0094697 A1 | 5/2005 | Armier et al. | |
| 2005/0107773 A1 | 5/2005 | Bergt et al. | |
| 2005/0111496 A1 | 5/2005 | Reeder et al. | |
| 2005/0111500 A1 | 5/2005 | Harter et al. | |
| 2005/0111514 A1 | 5/2005 | Matsumoto et al. | |
| 2005/0157762 A1 | 7/2005 | DeMaria et al. | |
| 2005/0190809 A1 | 9/2005 | Peterson et al. | |
| 2005/0202611 A1 | 9/2005 | Mitsuhashi et al. | |
| 2005/0205778 A1 | 9/2005 | Kitai et al. | |
| 2005/0220164 A1 | 10/2005 | Mori et al. | |
| 2005/0226286 A1 | 10/2005 | Liu et al. | |
| 2005/0226287 A1 | 10/2005 | Shah et al. | |
| 2006/0044981 A1 | 3/2006 | Egawa et al. | |
| 2006/0061854 A1 | 3/2006 | Dane et al. | |
| 2006/0092522 A1 | 5/2006 | Lizotte | |
| 2006/0092995 A1 | 5/2006 | Frankel et al. | |
| 2006/0108097 A1* | 5/2006 | Hodes | F28F 3/048 |
| | | | 165/80.4 |
| 2006/0114947 A1 | 6/2006 | Morita | |
| 2006/0114956 A1 | 6/2006 | Sandstrom et al. | |
| 2006/0161381 A1 | 7/2006 | Jetter | |
| 2006/0191063 A1 | 8/2006 | Elkins et al. | |
| 2006/0227841 A1 | 10/2006 | Savich | |
| 2006/0245084 A1 | 11/2006 | Brustle et al. | |
| 2006/0249491 A1 | 11/2006 | Jurgensen | |
| 2006/0266742 A1 | 11/2006 | Hall | |
| 2006/0287697 A1 | 12/2006 | Lennox | |
| 2007/0029289 A1 | 2/2007 | Brown | |
| 2007/0030875 A1 | 2/2007 | Takazane et al. | |
| 2007/0086493 A1 | 4/2007 | Apolonski et al. | |
| 2007/0098024 A1 | 5/2007 | Mitchell | |
| 2007/0138151 A1 | 6/2007 | Tanaka et al. | |
| 2007/0177260 A1 | 8/2007 | Kuppenheimer et al. | |
| 2007/0205186 A1 | 9/2007 | Kitai et al. | |
| 2007/0235458 A1 | 10/2007 | Hewkin | |
| 2007/0247499 A1 | 10/2007 | Anderson et al. | |
| 2007/0295974 A1 | 12/2007 | Fontanella et al. | |
| 2008/0042042 A1 | 2/2008 | King et al. | |
| 2008/0043791 A1* | 2/2008 | Miyajima | H01L 23/473 |
| | | | 372/36 |
| 2008/0043799 A1 | 2/2008 | Egawa et al. | |
| 2008/0094636 A1 | 4/2008 | Jin et al. | |
| 2008/0253415 A1 | 10/2008 | Livingston | |
| 2008/0253417 A1 | 10/2008 | Livingston | |
| 2008/0279247 A1 | 11/2008 | Scholz et al. | |
| 2008/0297912 A1 | 12/2008 | Baldwin | |
| 2009/0010285 A1 | 1/2009 | Dubois et al. | |
| 2009/0027753 A1 | 1/2009 | Lizotte | |
| 2009/0185176 A1 | 7/2009 | Livingston et al. | |
| 2009/0185590 A1 | 7/2009 | Livingston | |
| 2009/0188901 A1 | 7/2009 | Dantus | |
| 2009/0207478 A1 | 8/2009 | Oron et al. | |
| 2009/0245318 A1 | 10/2009 | Clifford, Jr. | |
| 2009/0312676 A1 | 12/2009 | Rousso et al. | |
| 2009/0323739 A1 | 12/2009 | Elliott et al. | |
| 2009/0323753 A1 | 12/2009 | Gmeiner et al. | |
| 2010/0132817 A1 | 6/2010 | Hewkin | |
| 2010/0206882 A1 | 8/2010 | Wessels et al. | |
| 2010/0220750 A1 | 9/2010 | Brownell | |
| 2010/0254415 A1 | 10/2010 | Oh et al. | |
| 2011/0032602 A1 | 2/2011 | Rothenberg | |
| 2011/0032603 A1 | 2/2011 | Rothenberg | |
| 2011/0032604 A1 | 2/2011 | Rothenberg et al. | |
| 2011/0043899 A1 | 2/2011 | Erlandson | |
| 2011/0097906 A1 | 4/2011 | Kwon et al. | |
| 2011/0102537 A1 | 5/2011 | Griffin et al. | |
| 2011/0127241 A1 | 6/2011 | Rumsby | |
| 2011/0127697 A1 | 6/2011 | Milne | |
| 2011/0128500 A1 | 6/2011 | Bille | |
| 2011/0227972 A1 | 9/2011 | Taniguchi et al. | |
| 2011/0253690 A1 | 10/2011 | Dane et al. | |
| 2011/0255088 A1 | 10/2011 | Dane et al. | |
| 2011/0259631 A1 | 10/2011 | Rumsby | |
| 2011/0266264 A1 | 11/2011 | Rumsby | |
| 2011/0286480 A1 | 11/2011 | Bayramian | |
| 2012/0106083 A1 | 5/2012 | Toftloekke et al. | |

(56) References Cited

U.S. PATENT DOCUMENTS

| | | | |
|---|---|---|---|
| 2014/0204713 | A1 | 7/2014 | Armbruster et al. |
| 2014/0224778 | A1 | 8/2014 | Armbruster et al. |

FOREIGN PATENT DOCUMENTS

| | | | | |
|---|---|---|---|---|
| DE | 10125447 | A1 | 1/2002 | |
| EP | 0157546 | A2 | 10/1985 | |
| EP | 0427229 | A3 | 5/1991 | |
| EP | 1184946 | A1 | 3/2002 | |
| EP | 2565673 | A1 | 3/2012 | |
| GB | 1495477 | A | 12/1977 | |
| GB | 2211019 | A | 6/1989 | |
| GB | 2249843 | A | 5/1992 | |
| GB | 2304641 | A | 3/1997 | |
| JP | 63-094695 | A * | 4/1988 | ............ H01S 3/041 |
| JP | 63094695 | A | 4/1988 | |
| JP | 5129678 | A | 5/1993 | |
| JP | 2001276986 | A | 10/2001 | |
| JP | 2007032869 | A | 2/2007 | |
| JP | 2007212118 | A | 8/2007 | |
| JP | 2011156574 | A | 8/2011 | |
| WO | 0046891 | A1 | 8/2000 | |
| WO | 0107865 | A2 | 2/2001 | |
| WO | 0243197 | A2 | 5/2002 | |
| WO | 2013034210 | A1 | 3/2013 | |

OTHER PUBLICATIONS

U.S. Appl. No. 14/342,508, Office Action dated Aug. 14, 2014.
U.S. Appl. No. 14/342,503, Office Action dated Aug. 21, 2014.
U.S. Appl. No. 14/342,487, Office Action dated Aug. 14, 2014.
U.S. Appl. No. 14/342,483, Office Action dated Oct. 2, 2014.
U.S. Appl. No. 14/342,493, Office Action dated Nov. 19, 2014.
U.S. Appl. No. 14/342,508, Final Office Action dated Dec. 10, 2014, 23 pages.
U.S. Appl. No. 14/342,503, Final Office Action dated Dec. 18, 2014, 22 pages.
Final Office Action for U.S. Appl. No. 14/342,487, dated Feb. 2, 2015, 31 pages.
Notice of Allowance and Fee(s) Due for U.S. Appl. No. 14/342,510, dated Feb. 20, 2015, 20 pages.
Notice of Allowance and Fee(s) Due for U.S. Appl. No. 14/342,503, dated Mar. 17, 2015, 11 pages.
Notice of Allowance and Fee(s) Due for U.S. Appl. No. 14/342,508, dated Apr. 1, 2015, 15 pages.
Notice of Allowance and Fee(s) Due for U.S. Appl. No. 14/342,483, dated Apr. 2, 2015, 26 pages.
Final Office Action for U.S. Appl. No. 14/342,493, dated Apr. 21, 2015, 25 pages.
Office Action for U.S. Appl. No. 14/342,487, dated Jul. 24, 2015, 17 pages.
Notice of Allowance and Fee(s) Due for U.S. Appl. No. 14/342,493, dated Jun. 24, 2015, 11 pages.
Office Action for U.S. Appl. No. 14/342,494, dated Oct. 2, 2015, 47 pages.
Notice of Allowance and Fee(s) Due for U.S. Appl. No. 14/342,487, dated Nov. 23, 2015, 47 pages.
Office Action for U.S. Appl. No. 14/342,481, dated Oct. 6, 2015, 77 pages.
Office Action for U.S. Appl. No. 14/342,477, dated Oct. 7, 2015, 74 pages.
Office Action for U.S. Appl. No. 14/342,495, dated Oct. 6, 2015, 77 pages.
Office Action for U.S. Appl. No. 14/342,499, dated Oct. 6, 2015, 77 pages.
Notice of Allowance and Fee(s) Due for U.S. Appl. No. 14/342,494, dated Feb. 10, 2016, 28 pages.
Final Office Action for U.S. Appl. No. 14/342,477, dated Mar. 22, 2016, 17 pages.
Final Office Action for U.S. Appl. No. 14/342,495, dated Apr. 12, 2016, 25 pages.
Final Office Action for U.S. Appl. No. 14/342,481, dated Apr. 26, 2016, 24 pages.
Final Office Action for U.S. Appl. No. 14/342,499, dated Apr. 26, 2016, 21 pages.
International Application No. PCT/EP2012/003073, Preliminary Report on Patentability, dated Sep. 26, 2013, 14 pages.
International Application No. PCT/EP2012/003072, Preliminary Report on Patentability, dated Mar. 12, 2014, 7 pages.
International Application No. PCT/EP2012/003071, Preliminary Report on Patentability, dated Mar. 12, 2014, 5 pages.
International Application No. PCT/EP2012/003070, Preliminary Report on Patentability, dated Mar. 12, 2014, 7 pages.
International Application No. PCT/EP2012/003069, Preliminary Report on Patentability, dated Nov. 27, 2013, 32 pages.
International Application No. PCT/EP2012/003068, Preliminary Report on Patentability, dated Mar. 12, 2014, 5 pages.
International Application No. PCT/EP2012/003067, Preliminary Report on Patentability, dated Nov. 28, 2013, 19 pages.
International Application No. PCT/EP2012/003066, Preliminary Report on Patentability, dated Nov. 28, 2013, 19 pages.
International Application No. PCT/EP2012/003065, Preliminary Report on Patentability, dated Nov. 28, 2013, 21 pages.
International Application No. PCT/EP2012/003064, Preliminary Report on Patentability, dated Nov. 15, 2013, 18 pages.
International Application No. PCT/EP2012/003063, Preliminary Report on Patentability, dated Mar. 12, 2014, 5 pages.
International Application No. PCT/EP2012/003062, Preliminary Report on Patentability, dated Mar. 12, 2014, 6 pages.
International Application No. PCT/EP2012/003061, Preliminary Report on Patentability, dated Mar. 12, 2014, 6 pages.
International Application No. PCT/EP20121003073, Search Report and Written Opinion, dated Dec. 18, 2012, 8 pages.
International Application No. PCT/EP2012/003072, Search Report and Written Opinion, dated Oct. 8, 2012, 11 pages.
International Application No. PCT/EP2012/003071, Search Report and Written Opinion, dated Nov. 15, 2012, 9 pages.
International Application No. PCT/EP2012/003070, Search Report and Written Opinion, dated Oct. 8, 2012, 11 pages.
International Application No. PCT/EP2012/003069, Search Report and Written Opinion, dated Sep. 27, 2012, 8 pages.
International Application No. PCT/EP2012/003068, Search Report and Written Opinion, dated Nov. 15, 2012, 8 pages.
International Application No. PCT/EP2012/003067, Search Report and Written Opinion, dated Nov. 16, 2012, 7 pages.
International Application No. PCT/EP2012/003066, Search Report and Written Opinion, dated Nov. 15, 2012, 7 pages.
International Application No. PCT/EP2012/003065, Search Report and Written Opinion, dated Nov. 16, 2012, 7 pages.
International Application No. PCT/EP2012/003064, Search Report and Written Opinion, dated Nov. 16, 2012, 7 pages.
International Application No. PCT/EP2012/003063, Search Report and Written Opinion, dated Nov. 15, 2012, 9 pages.
International Application No. PCT/EP2012/003062, Search Report and Written Opinion, dated Nov. 15, 2012, 10 pages.
International Application No. PCT/EP2012/003061, Search Report and Written Opinion, dated Sep. 10, 2012, 9 pages.
U.S. Appl. No. 14/342,504, Office Action 1 dated Jun. 22, 2016, 81 pages.
U.S. Appl. No. 14/342,481, Office Action 2 dated Aug. 17, 2016, 24 pages.
U.S. Appl. No. 14/342,495, Office Action 2 dated Aug. 17, 2016, 22 pages.
U.S. Appl. No. 14/342,499, Office Action 2 dated Aug. 17, 2016, 21 pages.
U.S. Appl. No. 14/342,477, Office Action 2 dated Aug. 18, 2016, 27 pages.
U.S. Appl. No. 14/342,504, Final Office Action 1 dated Nov. 17, 2016, 19 pages.
U.S. Appl. No. 14/342,499, Notice of Allowance dated Dec. 5, 2016, 12 pages.

(56) References Cited

OTHER PUBLICATIONS

U.S. Appl. No. 14/342,481, Notice of Allowance dated Dec. 5, 2016, 12 pages.
U.S. Appl. No. 14/342,495, Notice of Allowance dated Dec. 8, 2016, 14 pages.
U.S. Appl. No. 14/342,477, Notice of Allowance dated Dec. 22, 2016, 19 pages.
U.S. Appl. No. 14/342,504, Notice of Allowance dated Feb. 28, 2017, 15 pages.

* cited by examiner

MARKING APPARATUS WITH AT LEAST ONE GAS LASER AND HEAT DISSIPATOR

FIELD OF THE INVENTION

The present invention relates to a marking apparatus for marking an object with laser light.

RELATED ART

A generic marking apparatus for marking an object with laser light comprises at least one gas laser for emitting at least one laser beam for marking the object.

Generating laser light produces heat at the gas laser which is to be dissipated.

A conventional marking apparatus thus comprises a cooling device which is typically housed in the same casing as the gas lasers and many other components of the marking apparatus. Known cooling devices are rather space consuming and render the apparatus quite immobile which limits the field of application.

Conventional marking apparatuses constitute a trade-off between cooling power and flexibility. For instance, simple and compact cooling mechanisms that are restricted to a fan and cooling fins may allow for a flexible use of the apparatus. However this is achieved at the expense of cooling power.

JP 63094695 discloses a gas laser with a rectangular arrangement of laser tubes. For cooling the laser tubes, metallic pipes containing a cooling fluid are arranged next to the laser tubes.

Another gas laser is described in U.S. Pat. No. 3,705,999. The laser comprises a plurality of cooling channels neighbouring a laser tube.

Subject-matter of U.S. Pat. No. 4,500,998 is a gas laser wherein a cooling pipe is positioned within the pipe carrying the laser gas used for producing laser light.

A gas slab laser is described in U.S. Pat. No. 5,982,803. The laser may be cooled via meander-shaped water cooling channels. Alternatively, a finned heat sink and a fan may be provided for air cooling.

Subject-matter of JP 05129678 is a laser marking device with cooling water passages being disposed next to laser gas discharge spaces.

A carrying structure for components of a gas laser resulting in a horizontal arrangement of the resonator tube is disclosed in U.S. Pat. No. 5,115,446 A.

SUMMARY OF THE INVENTION

It is an object of the invention to provide a marking apparatus that exhibits a particularly efficient cooling, while at the same time the space requirements are moderate.

This objective is solved with a marking apparatus.

Preferred embodiments are given in the following description, in particular in connection with the attached figures.

According to the invention, the marking apparatus of the above mentioned kind is characterized in that the at least one gas laser comprises a plurality of resonator tubes for receiving a laser gas, a plurality of heat dissipaters for dissipating heat from the resonator tubes is provided, each resonator tube is thermally connected to one of the heat dissipaters, and each heat dissipater comprises microchannels for receiving a cooling fluid.

It can be regarded as an idea of the invention to employ a cooling fluid for absorbing heat produced by the gas laser and for conducting the heat away from the gas laser. The provision of microchannels may lead to a particularly efficient transfer of heat from the walls of the microchannels to the cooling fluid received therein. The cooling fluid may allow transport of the heat far away from the gas laser. A heat exchanger for transferring heat from the cooling fluid to a surrounding does thus not heat up the immediate surrounding of the gas laser which would harm the cooling efficiency.

Microchannels are generally known as channels that have a high aspect ratio, that is the height to width ratio. They may have a hydraulic diameter of roughly 1 mm. In general, any channel with the smaller dimension less than 2 mm, or alternatively, smaller than 1 mm may be understood as a microchannel.

Microchannel cooling devices are most commonly used in applications where there is a high thermal density. That is, a very localized heat source. Thus, microchannel cooling devices are found in computers to cool the processors or CPUs, for example. A large number of such channels can be fabricated in the vicinity of the localized heat source. The high thermal extraction efficiency of these devices is, therefore, due to the relatively large surface area for the coolant to remove the heat.

However, the low hydraulic diameter rather leads to the flow through the device being fully formed or laminar. An excessively large pump would be required to generate sufficient flow velocity to generate turbulent flow in such a small channel. In typical microchannel applications where the length of the channels is short, the small improvement in cooling efficiency does justify the use of powerful pumps.

The conventional $CO_2$ laser design is large and the heat is distributed over a large surface area. Such a design is not conducive to microchannel cooling and such cooling means are not found in conventional $CO_2$ lasers.

However, with the novel design for a $CO_2$ laser of the invention, the heat density produced is sufficiently high that microchannel cooling can be efficiently applied. It may also desirable to keep the rest of the cooling system as small as possible.

The cooling fluid may in general be any fluid, i.e., gas or liquid. Water, or a liquid with a specific heat capacity higher than the one of water, may be employed as a cooling fluid. The cooling fluid may be suited for the principle of a conventional air conditioner, that means, the vaporization temperature of the cooling fluid is below a working temperature of the gas lasers. The heat of the resonator tubes would then suffice to vaporize the cooling fluid inside the microchannels, resulting in particularly good cooling of the resonator tubes. One example of such a cooling fluid comprises hydro-fluorocarbons (HFCs).

The heat dissipaters that comprise the microchannels may also be referred to as heat collectors, as they receive or absorb the heat of the resonator tubes. A material of the heat dissipaters may be any substrate suitable for the fabrication of micro-channels therein. The material of the heat dissipater may be chosen such that its heat expansion coefficient matches the one of the resonator tubes. This may ensure a good thermal contact independent of the temperature of the resonator tubes to be cooled. The thermal connection between the resonator tubes and the heat dissipater may be achieved by a mechanical contact. Additionally or alternatively, a material with a high heat transfer coefficient may be inserted in between, such as a thermal compound or heat conducting paste.

The at least one gas laser may be of any generally known kind, such as a HeNe laser, a CO laser, an Argon laser, a nitrogen laser, or an excimer laser. The at least one gas laser may be a $CO_2$ laser which may be operated as cw. or pulsed. The laser gas is to be understood as a gas mixture corresponding to the laser type, and may thus comprise $CO_2$, $N_2$, and He.

The marking of the object may be any visible change in the object's surface, e.g. a color or brightness change, an engraving or a cut. The marking may be a dot or a line that may be part of a sign, a character, or a picture. That is, the at least one gas laser may be activated for short periods to produce dots on the object or for a settable time span to create lines of a certain length.

In the context of embodiments of the invention, the object to be marked may be any item or product with a surface that can be affected with the light of the gas lasers. In particular, the object may be a packaging, e.g. for food or beverage, a fruit or a label. Further fields of application comprise printing on pills or labels for postal appliances.

The material of the object may comprise, amongst others, plastics, paper, metals, ceramics, fabrics, composites or organic tissues.

The plurality of resonator tubes of one gas laser are interconnected to form one common volume in which the laser gas is received. The common volume is sealed, that means that the laser gas is not exchanged during regular operation. Compared to a laser with flowing laser gas, this allows for a compact design. However, while in a flowing gas laser the laser gas that is heated up can be easily exchanged, the enclosed laser gas in the sealed tubes dictates tougher demands on cooling.

Each resonator tube may be a straight tube. These straight tubes may be linked at an angle with connecting elements, i.e. connecting tubes. For directing laser light generated inside the tubes from one tube to a neighbouring tube, each connecting tube may house a mirror.

According to an embodiment of the invention, surface perturbations, such as steps or other protrusions, are introduced into a least one wall of the microchannel to act as a means for disturbing the laminar flow and to cause a disruption of the boundary layer of the cooling fluid at the wall surfaces of the microchannel. This boundary layer is a high thermal resistance to the transfer of heat to the cooling fluid. The disruption of the boundary layer reduces that thermal resistance and improves the cooling efficiency of the microchannel. In this manner, longer channel lengths can be utilized without the need for high fluid velocities. A transient turbulent flow may exhibit eddies which transport cooling fluid heated at the walls of the microchannels to the center of the microchannels. In contrast to a fully formed laminar flow, this leads to a rather uniform temperature distribution along the cross section of the microchannels and thus improves heat absorption by the cooling fluid.

Another embodiment of the invention is characterized in that the micro-channels of each of the heat dissipaters extend substantially along the whole length of the respective resonator tube, that is the resonator tube that is thermally connected to said heat dissipater. Heat can then be absorbed over the whole lengths of the tubes, which improves the cooling efficiency. A robust design may be achieved when the heat dissipaters are mounted to the connecting tubes that connect neighbouring resonator tubes.

The microchannels of one heat dissipater may be interconnected and run in any shape, in some cases in parallel or in a meander-like pattern. Each heat dissipater may comprise an inlet channel and an outlet channel for leading the cooling fluid into and out of the microchannels of the respective heat dissipater.

The inlet channels of all heat dissipaters may be in fluidic connection to a common supply line or hose which conveys cooling fluid that has been cooled by a cooling device. All outlet channels may be correspondingly connected to one common dissipation line that leads away the cooling fluid that has been warmed by the lasers.

Alternatively, the outlet channel of one heat dissipater may be connected to an inlet channel of another heat dissipater such that there is only one inlet channel that is connected to the supply line, and only one outlet channel that is connected to the dissipation line.

It may be preferred that for each resonator tube at least one electrode for exciting the laser gas received in the respective resonator tube is provided, and each heat dissipater is formed as a base body which accommodates the microchannels of the respective heat dissipater and at least one of the electrodes. Each base body may be formed integrally. In this base body, the microchannels as well as an electrode are provided. Another electrode may be provided opposite the respective resonator tube, that is outside the heat dissipater. The electrodes serve for exciting the laser gas inside the tubes. To this end, they are supplied via electrical lines with a direct current or an alternating current. An alternating current with radio frequency may be used.

The electrodes are preferably excited with planar coils, i.e., the coils extend only in a 2D-plane. This further minimizes the required space.

An embodiment of the inventive marking apparatus is characterized in that a connector or connecting element, in particular a socket or a plug, is provided for connecting an umbilical cable for conducting the cooling fluid to and away from the marking apparatus. A heat rejecter for dissipating the heat of the cooling fluid to an environment is thus not present in the casing of the marking apparatus. The umbilical cable rather guides the cooling fluid to a heat rejecter located in a base unit outside the marking apparatus. The size of the marking apparatus is thus further reduced. A power supply, e.g. a battery pack or a transformer for converting line voltage to a voltage suitable for the gas lasers, may be located in the base unit outside the marking apparatus. A power supply is then not necessary in the marking apparatus. Space requirements of the apparatus are then further reduced. Additionally, dissipation of heat produced by the power supply away from the apparatus is rendered obsolete.

According to another embodiment of the invention, grooves for receiving the cooling fluid are formed on the surface of the resonator tubes. The heat dissipaters may be tightly attached to the resonator tubes such that circumferentially closed channels are formed with the grooves. Furthermore, at least some of the microchannels of the heat dissipaters extend perpendicularly to the longitudinal axes of those resonator tubes to which the heat dissipater of the respective microchanneis is thermally connected, and said at least some of the microchanneis are in fluidic connection with the grooves on the resonator tubes' surfaces. In other words, at least some of the microchanneis of the heat dissipaters extend substantially perpendicularly to the grooves formed on the surface of the resonator tubes. The grooves on the resonator tubes may have the same diameter as the microchanneis of the heat dissipaters and may also be referred to as microchanneis. The grooves may be sealed by mechanically connecting the heat dissipaters to the resonator tubes, that is, the heat dissipater may be formed as a plate made of e.g. plastics, a metal or ceramic and may cover the grooves on the resonator tube's surface. The microchanneis of the heat dissipaters may be formed as microjets or holes punched into the plate. A gain in efficiency is hereby achieved, as microchanneis are very close to the heat source, i.e. the laser gas.

Alternatively to the grooves or additionally, the resonator tubes may comprise microchannels in their walls and these microchannels are connected to the microchannels of the heat dissipaters.

Furthermore, it may be preferred that the resonator tubes at least partially surround an inner area, and optical elements and/or electronics are arranged in the inner area. The partially surrounding of an inner area may be understood such that the inner area is bordered by resonator tubes at a central angle of at least 180°, such as a semi-circle. The resonator tubes may thus form an open or closed loop or circle.

By this arrangement of the resonator tubes, the total length of all tubes may be much larger than the length of the apparatus. The electronics may comprise drive circuits for controlling the electrodes. The optical elements may comprise fixed mirrors, scanning mirrors or optical waveguides for redirecting the laser beam emitted by the gas laser. Placing the electronics and/or the optical elements inside the inner area is beneficial for a space-saving design.

In contrast to a folded resonator tube configuration, in which the resonator tubes of one laser are arranged right next to each other as in a zigzag or meander-like pattern, the arrangement according to the inventive embodiments allows for disposing electronics and optical elements between the resonator tubes. The overall size of the apparatus may be comparable in both cases, but the distance between resonator tubes is larger in the inventive design. Cooling of the resonator tubes may thus be facilitated. Furthermore, a larger surface of the resonator tubes may be accessible for thermal connection to the heat dissipaters.

According to an embodiment of the invention, the apparatus further comprises beam delivery means such as at least one mirror for directing the laser beam or beams into the inner area. It is generally also possible that the beam-delivery means are formed by output coupler mirrors of the gas lasers. In this case a resonator tube end portion of each gas laser may point into the direction of the inner area. Furthermore, deflection means are provided in the inner area for directing the laser beams into the direction of the object to be marked. The deflection means may comprise at least one deflection means per laser beam, in particular at least one, in some cases at least two, mirrors or optical waveguides per laser beam, for individually deflecting each of the laser beams into a desired direction. That is, each deflection means is individually adjustable in its deflection direction and/or individually shiftable. The deflection means may be motorized to be adjusted by a control unit, in particular for performing a scanning movement.

Another embodiment of the invention is characterized in that a plurality of gas lasers which includes the at least one gas laser is provided. Furthermore, a control unit is provided for individually activating each of the gas lasers to emit a laser beam according to a sign to be marked. Each of the gas lasers comprises a plurality of resonator tubes that at least partially surround the inner area, and the gas lasers are stacked on top of each other such that each resonator tube of one of the gas lasers is aligned in parallel with one of the resonator tubes of another gas laser.

In other words, each plurality of resonator tubes of one of the gas lasers comprises a first resonator tube and at least a second resonator tube, all first resonator tubes are stacked and aligned in parallel to each other, and all second resonator tubes are stacked and aligned in parallel to each other. In this embodiment, the laser beams emitted by the gas lasers form an array of laser beams, in particular a linear array with laser beams running in parallel to each other.

It may be preferred that those resonator tubes that are stacked and aligned in parallel to each other share one heat dissipater out of the plurality of heat dissipaters, which one heat dissipater is thermally connected to all of said parallel resonator tubes. In other words, all resonator tubes of different gas lasers which resonator tubes extend parallel to each other are stacked on top of each other and share one heat dissipater.

An embodiment of the inventive apparatus is characterized in that each gas laser comprises connecting elements that connect adjacent resonator tubes of the respective gas laser to form a common tubular space, the connecting elements of the gas lasers each comprise an inner cavity which is in fluidic communication with the at least two adjacent resonator tubes connected to the connecting element.

According to still another embodiment of the invention, the resonator tubes of each gas laser are arranged in the shape of a triangle, a rectangle, a polygon, a square, an open or closed circle, or in a U-shape. The term "closed" may be understood such that one connecting element is provided which houses both an end mirror of a gas laser for reflecting laser light back inside the gas laser and a partially reflective output coupler for emitting a laser beam. Correspondingly, the term "open" is to be understood such that the end mirror and the output coupler of one gas laser are accommodated in different end elements, i.e. not in one connecting element.

In the closed design, the laser gas may either form a whole circuit, or may be split within the connecting element which houses the output coupler and the end mirror.

The invention further relates to a marking device which comprises a marking apparatus as described above, and further comprises a pump for pumping the cooling fluid through the microchannels. The pump may be of any generally known kind. One example of a pump is an electroosmotic pump which uses an external electric field, e.g. through a microporous glass frit, to move ions within the cooling fluid. Simple ion drag creates then a net motion of the cooling fluid.

According to another embodiment of the inventive marking device, all gas lasers are accommodated in a first housing. The pump, however, is accommodated in a second housing or base unit. A heat rejecter for dissipating heat of the cooling fluid to an environment may also be provided in the second housing. The first housing and the second housing are then connected with the umbilical cable. The marking apparatus is thus reduced in size. As the umbilical cable is flexible, movability of the marking apparatus is enhanced. A motor device may be provided for moving the marking apparatus relative to the second housing.

The pumping power may further be adjusted dependent on the temperature of the resonator tubes. To determine that temperature, a temperature sensor may be provided, either in the first housing which accommodates the resonator tubes, or in the second housing which may accommodate the pump and the heat rejecter. In the latter case, the temperature sensor may determine the temperature of the cooling fluid which is heated by the resonator tubes. In the case of the temperature sensor being accommodated in the first housing, the temperature sensor may be arranged on a surface of one of the resonator tubes. Alternatively the temperature sensor may be formed as a resistor which is accommodated in the same base body as one of the electrodes for exciting the laser gas.

BRIEF DESCRIPTION OF THE DRAWINGS

The invention is described in greater detail below by reference to preferred embodiments which are illustrated in the attached drawings in which.

Equivalent components are referred to in all figures with the same reference signs, respectively.

DETAILED DESCRIPTION OF THE INVENTION

Figure 1:
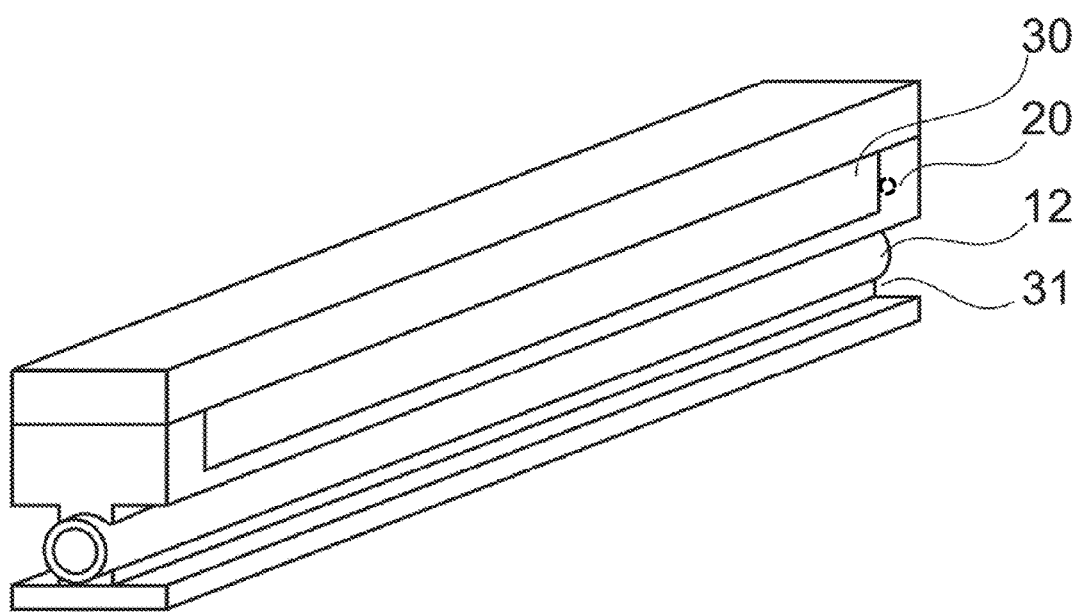
FIG. 1 shows a schematic perspective view of a part of a gas laser of an inventive marking apparatus.

FIG. 1 shows schematically a part of a gas laser of an inventive marking apparatus. Depicted is one of the resonator tubes 12 as well as a heat dissipater 30 and electrodes 20, 31.

The resonator tube 12 is filled with a laser gas. The ends of the resonator tube are connected to connecting elements (not depicted) to form a sealed volume.

For exciting the laser gas, two electrodes 20, 31 per resonator tube 12 are provided. The heat dissipater 30 is accommodated within or directly attached to the electrode 20.

The electrode 20 contacts the resonator tube 12 over its complete length, i.e. in the axial direction. The surface of the electrode 20 facing the resonator tube 12 has a concave shaped which matches the convex shape of the resonator tube 12 to form a large contact area. The contact area may extend over at least a quarter of the circumferential length of the resonator tube 12. For avoiding an air gap, the electrode 20 may be pressed against the resonator tube 12. Alternatively or additionally, a thermal compound may be inserted in between.

The material of the heat dissipater 30 may exhibit a high heat transfer coefficient. To this end, copper of aluminium may be employed. Within the heat dissipater 30, microchannels for conducting a cooling fluid are formed. The cooling fluid is introduced through an entrance microchannel that runs perpendicular to the longitudinal axis of the resonator tube 12. The entrance microchannel is connected to one or several longitudinal microchannels that extend along the longitudinal axis of the resonator tube 12. These microchannels are connected to an exit microchannel through which the cooling fluid can be pumped out of the heat dissipater 30. The exit microchannel may thus also be referred to as dissipating microchannel.

During operation of the gas laser, the laser gas and thus the resonator tube 12 heats up. A high temperature deteriorates the lasing efficiency and may even prevent lasing. Excess heat is thus to be dissipated. To this end, the heat dissipater 30 with the microchannels is provided. Firstly, the heat dissipater 30 absorbs heat of the resonator tube 12 through the electrode 20. This leads to the cooling fluid in the microchannels being heated as well. The microchannels may have a very small diameter, such as smaller than 2 mm or even smaller than 1 mm. Within the microchannels, or at least within the longitudinal microchannels, the cooling fluid flows turbulently due to perturbations on at least one wall of each microchannel. A turbulent flow improves the heat transfer between the heat dissipater and the cooling fluid.

The number of longitudinal microchannels may be larger than the number of entrance or exit microchannels. In this case, the cross section of the entrance and exit microchannels may be formed larger than the cross section of the longitudinal microchannels and may equal the total cross section of all longitudinal microchannels combined.

Figure 2:
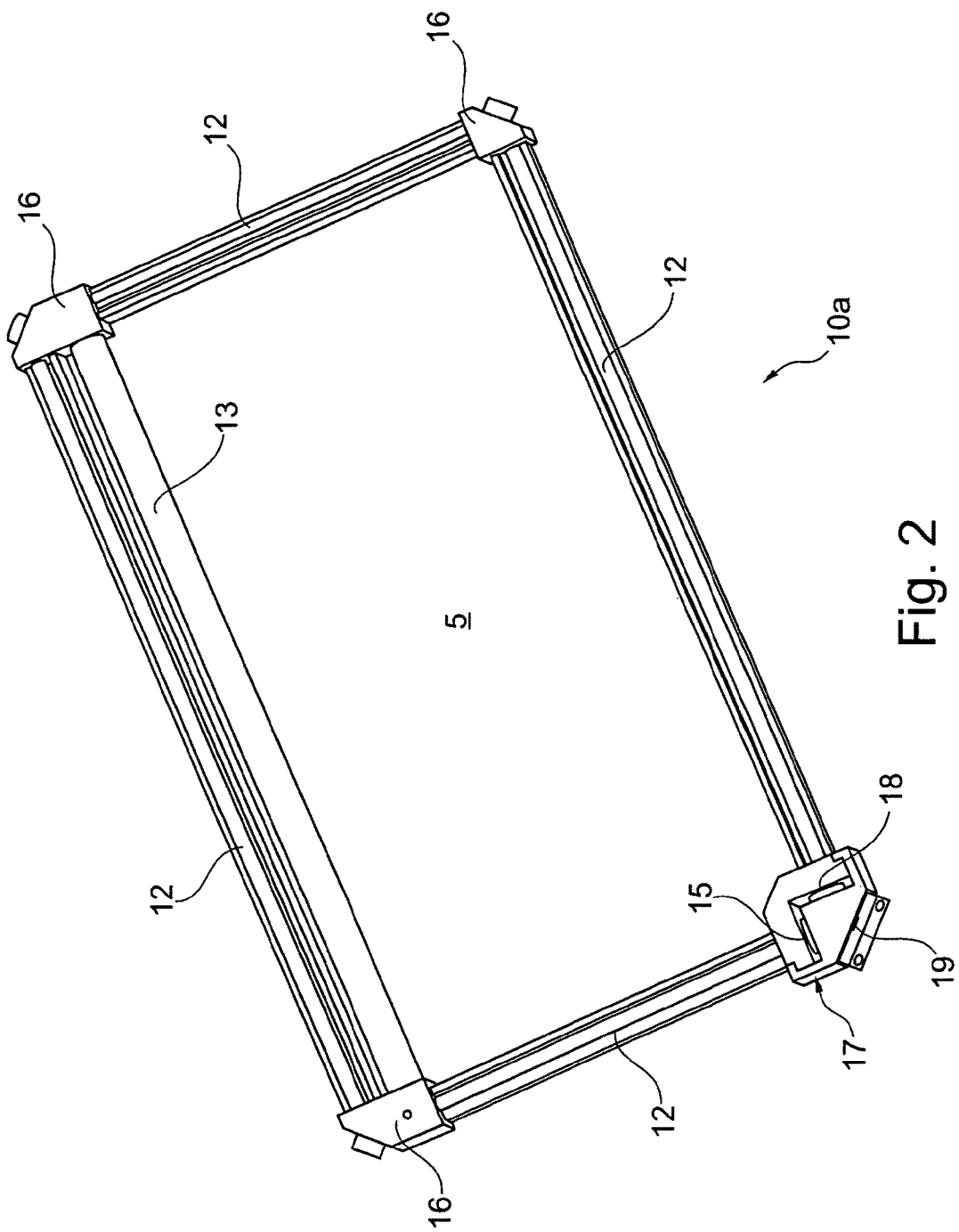
FIG. 2 shows a perspective view of a gas laser of an inventive marking apparatus.

Turning to FIG. 2, a gas laser 10a is schematically shown. The gas laser 10a comprises a plurality of resonator tubes 12. In the embodiment shown, there are four resonator tubes 12 which constitute a rectangle. However, in general any number of resonator tubes may be provided which are arranged in a convex or circle-like fashion.

In three corners of the rectangle, connecting elements 16 for connecting adjacent resonator tubes 12 are provided. These connecting elements 16 are shaped as hollow tubes such that one common gas volume is formed with the resonator tubes 12. The common gas volume is sealed to avoid leakage of the laser gas.

It may be beneficial that a gas mixture received in the common gas volume remains constant, as changes may decrease the laser efficiency. To slow down changes, an additional gas reservoir, namely a gas tube 13, is provided. This gas tube 13 is filled with laser gas but is not equipped with electrodes, i.e., gas within the gas tube 13 is not excited during the operation of the laser 10. The gas tube 13 is arranged parallel to one of the resonator tubes 12 and forms a common gas volume with the resonator tubes 12. To this end, at least two of the connecting elements 16 each comprise an additional opening to which the gas tube 13 is connected.

In the fourth corner of the rectangular resonator tube arrangement, the neighboring resonator tubes 12 are supported by a connecting element 17 which houses an end mirror 15 and an output coupler 18. In the example shown, the gas volume is terminated with the end mirror 15 on one side and with the output coupler 18 on the other side such that there is no gas connection within the connecting element 17.

The output coupler 18 may be a partially reflecting mirror which outputs a laser beam. The laser beam is redirected with beam delivery means 19. These may be constituted by a mirror 19 connected to an outer surface of the connecting element 17. The mirror 19 directs the laser beam through an opening in the connecting element 17 into an inner area 5, that is an area 5 enclosed by the resonator tubes 12. In the inner area 5, further optical elements for deflecting the laser beam in the direction of an object to be marked may be provided.

Although only one gas laser 10a is shown in FIG. 2, in some cases a plurality of gas lasers is provided. Each gas laser may be formed as the one shown in FIG. 2. In particular, each gas laser may comprise its own electrodes, output coupler, rear mirror and optical elements arranged in the inner area.

Figure 3:
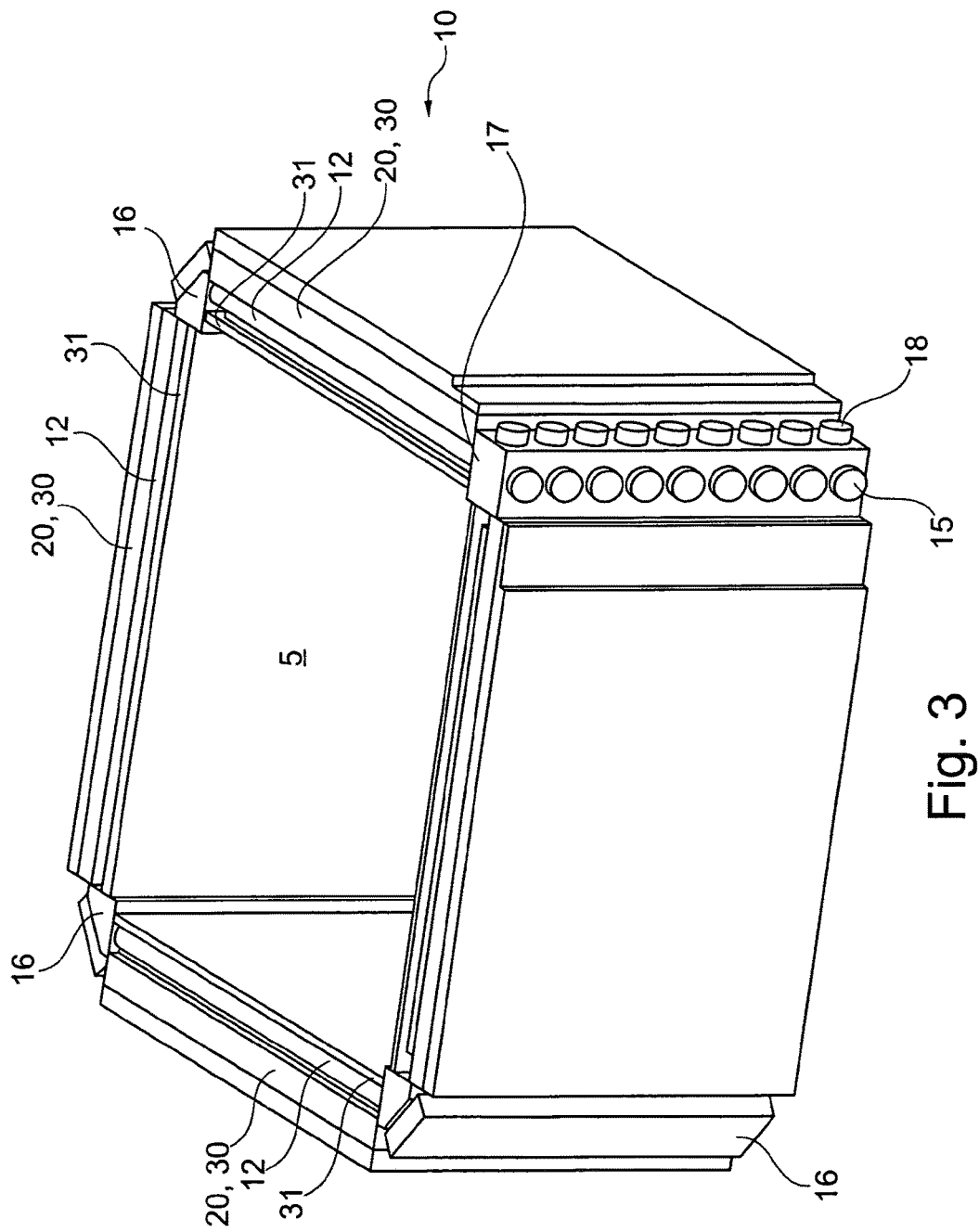
FIG. 3 shows a plurality of gas lasers of an inventive marking apparatus.

Such a plurality of gas lasers is depicted in FIG. 3. In this example, the plurality of gas lasers 10 comprises nine gas lasers. These are arranged on top of each other. That is, above each resonator tube of a first gas laser a resonator tube of a second gas laser is placed.

The gas lasers 10 share common connecting elements 16, 17. Hence, each connecting element 16 comprises openings for connection of two resonator tubes per gas laser. In the depicted embodiment with nine lasers, that is eighteen openings. This enhances stability and reduces manufacturing costs. The gas volumes of different gas lasers may be interconnected within the connecting elements 16. This enhances the conformity and stability of the laser gas mixture, as a gas change within the resonator tubes of one gas laser is spread and thus diluted over all gas lasers. Furthermore, by interconnecting the gas volumes of different lasers within the connecting elements 16, one gas tube with additional gas (not shown) suffices for all lasers 10.

For redirecting laser light from one resonator tube 12 of one gas laser to another resonator tube 12 of the same laser, each connecting element 16 comprises a mirror. The connecting elements 16 may have an additional opening such that the mirror can be attached at that opening from outside. This facilitates assembly of the marking apparatus.

The common connecting element 17 comprises one output coupler 18 and one rear mirror 15 per gas laser. Manufacture is further eased if the common connecting element 17 comprises additional openings which are closed with the output couplers 18 and/or the rear mirror 15. That is, the common connecting element 17 may have openings at four sides; at two of these sides the resonator tubes 12 are connected, whereas the output couplers 18 and the rear mirrors 15 are attached from outside to the openings of the remaining two sides.

Each resonator tube 12 of each of the gas lasers 10 is equipped with its own pair of electrodes 20, 31 for exciting the laser gas. With the resonator tubes 12 being stacked, the electrodes 31 facing the inner area and the electrodes 20 on the opposite side of the resonator tubes 12 are likewise stacked. All electrodes 31 of one stack of resonator tubes may be located in or on one first common substrate. The electrodes 20 of one stack of resonator tubes are likewise arranged in or on a second common substrate.

On the outer side of the resonator tubes 12, i.e. the side of the resonator tubes 12 opposite the inner area 5, heat dissipaters 30 are provided. Each stack of resonator tubes 12 may be thermally connected to one common heat dissipater 30. The microchannels within one common heat dissipater 30 thus absorb the heat of the whole respective stack of resonator tubes 12.

Employing common heat dissipaters allows for the provision of only one entrance microchannel and one exit microchannel per common heat dissipater. This may reduce complexity of the design.

Generally, either the common heat dissipater 30 or the electrodes 20 may be arranged closer to the stack of resonator tubes 12. In the case that the common heat dissipater is closer, i.e. sandwiched between the resonator tubes 12 and the electrodes 20, the entrance and exit microchannels extend through the second common substrate on or in which electrodes 20 are mounted.

The common heat dissipater 30 and the second common substrate with the electrodes may either mechanically contact each other or may be formed by a common base body. This may further decrease the size of the marking apparatus.

In the example shown in FIG. 3, the inner area 5 accommodates electronics, e.g. driver circuits for controlling the electrodes 20, 31. Laser beams emitted through the output couplers 18, however, are not directed into the inner area 5.

Figure 4:
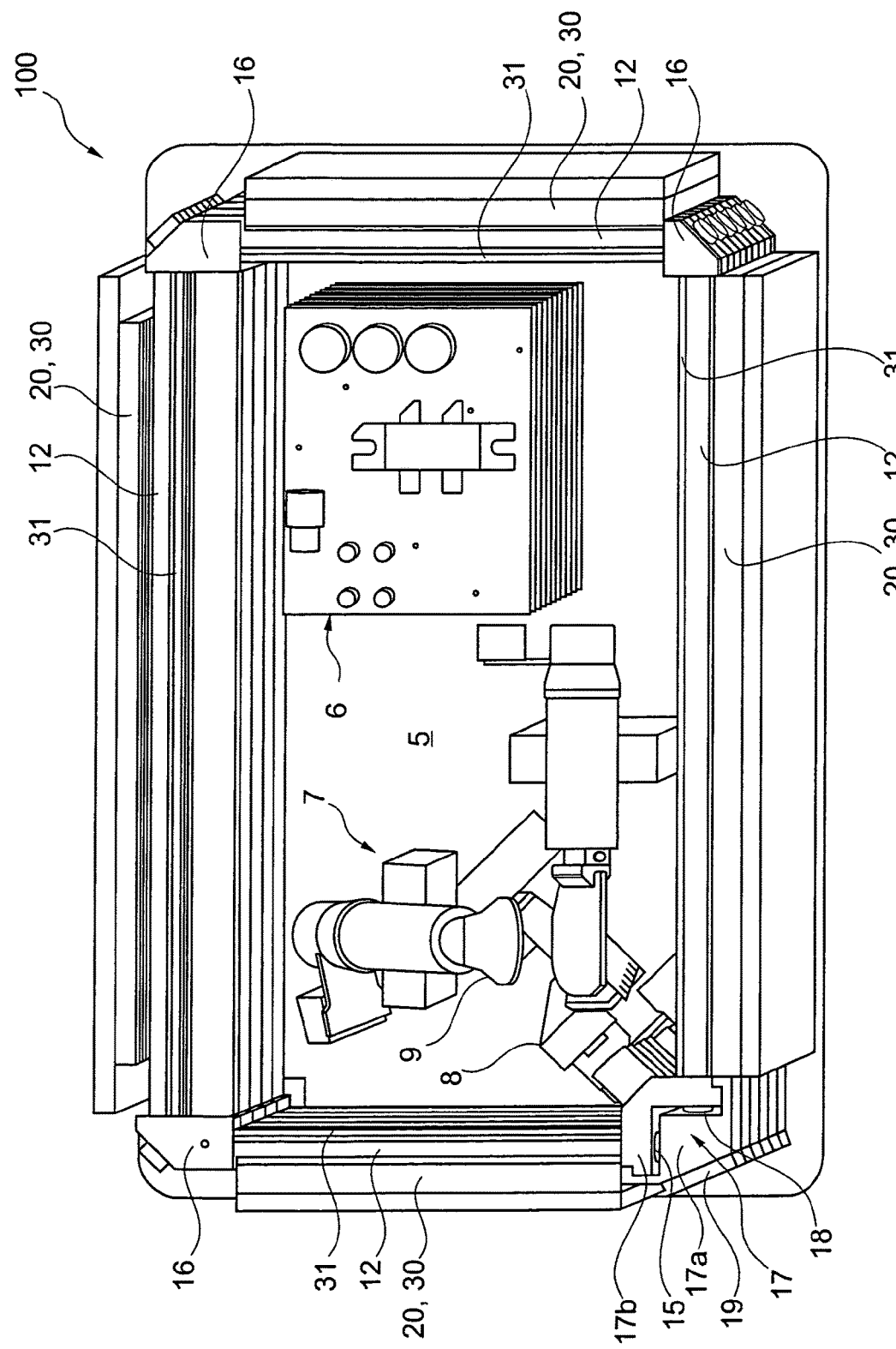
FIG. 4 shows an embodiment of the inventive marking apparatus.

Another embodiment of the inventive marking apparatus 100 is depicted in FIG. 4. As in the previous example, the marking apparatus 100 comprises a plurality of gas lasers 10, each of which comprises one output coupler for emitting a laser beam.

In this case, however, the emitted laser beams are directed into the inner area 5. To this end, the connecting element 17 is formed by a first and a second connecting part 17a, 17b. The second connecting part 17b has two openings per gas laser for connection of the resonator tubes 12 of the gas lasers. Furthermore, the second connecting part 17b has to additional openings per gas laser which openings are closed with the rear mirrors 15 and the output couplers 18. Beam delivery means 19 such as mirrors 19 are attached to the first connecting part 17a for redirecting laser beams emitted through the output couplers 18 into the inner area 5.

In the inner area 5, further optical elements 7 as well as electronic components 6 are disposed. The optical elements 7 may comprise a set of deflection means 8 having one deflection means, namely a mirror or an optical waveguide, per gas laser. The set of deflection means 8 thus allows for individually redirecting each of the emitted laser beams. The optical elements 7 may further comprise one or two galvanometer scanners 9, each having one mirror onto which the laser beams of all gas lasers impinge. With the galvanometer scanners 9, the laser beams can be scanned within the field of view of the marking apparatus 100.

Figure 5:
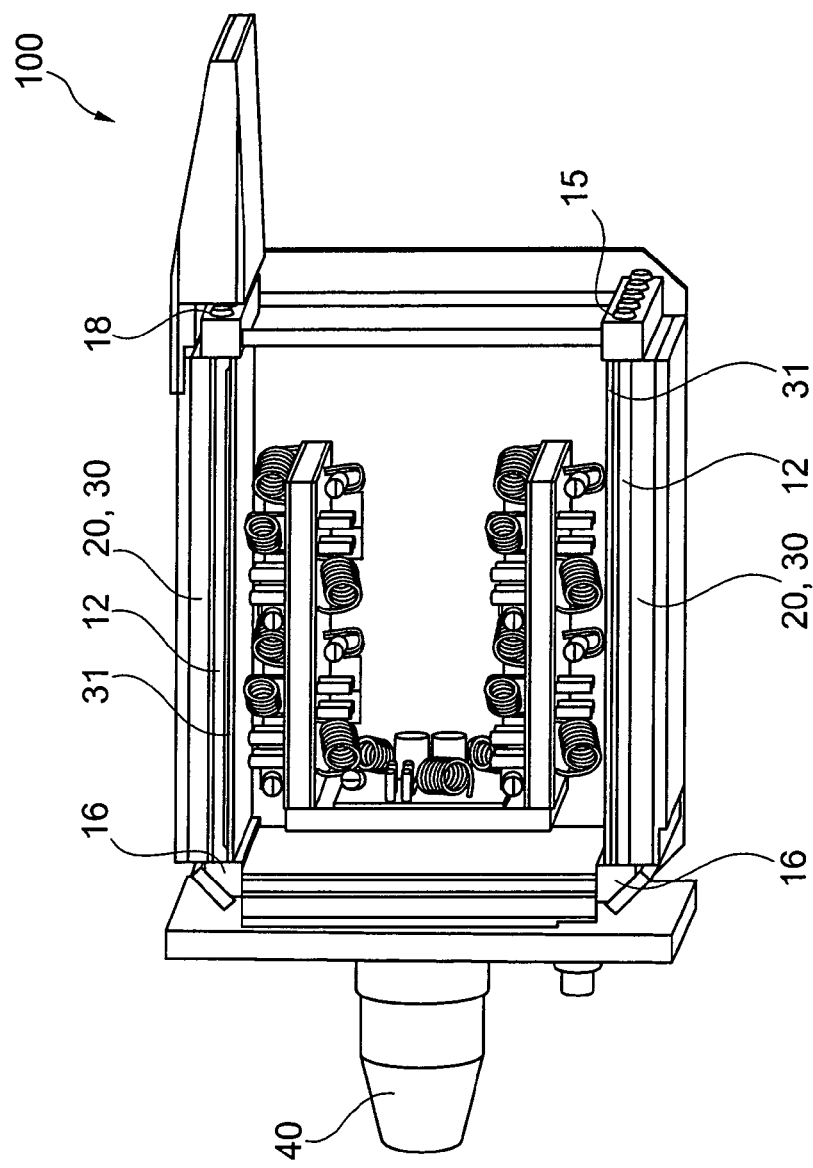
FIG. 5 shows another embodiment of the inventive marking apparatus.

In FIG. 5, another embodiment of an inventive marking apparatus 100 is shown. Here, each gas laser comprises three resonator tubes 12 which are arranged in a U-shape. The space between the two legs of this U-shape is to be understood as the inner area 5. The U is terminated at one end with a first connecting element at which the rear mirrors 15, but not the output couplers 18 are attached. Analogously, the U is terminated at the other end with a second connecting element at which only the output couplers 18 but no rear mirrors 15 are provided.

A connector 40 such as a female or male jack for connecting an umbilical cable is provided. Via this connector 40 cooling fluid can enter the apparatus and can be guided through the microchannels. After being warmed within the microchannels, the cooling fluid can exit the apparatus through the connector 40.

The connector 40 may further comprise electrical contacts such that the marking apparatus 100 can be supplied with electrical power via the umbilical cable.

Figure 6:
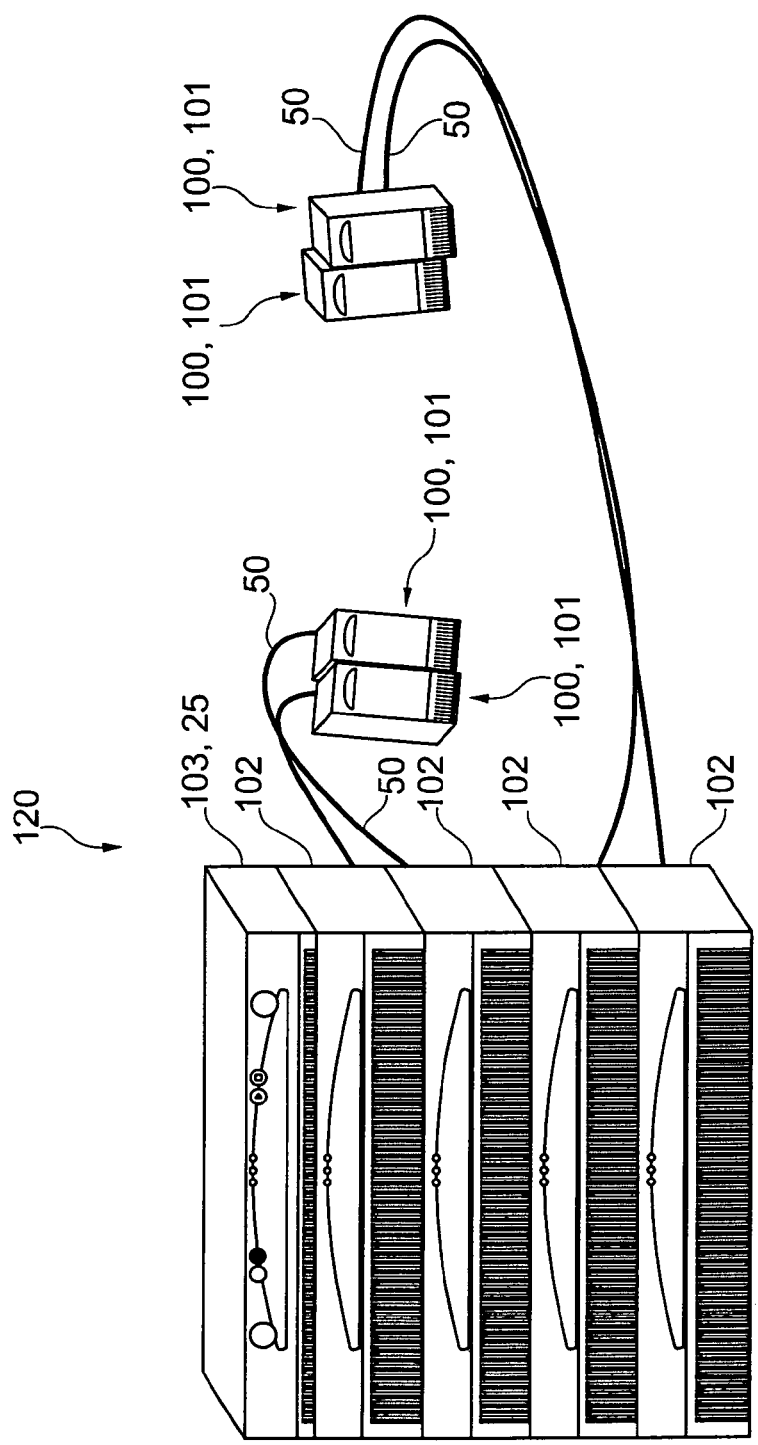
FIG. 6 shows an embodiment of an inventive marking device.

An embodiment of an inventive marking device 120 is shown in FIG. 6. The marking device 120 comprises at least one marking apparatus 100 which is accommodated in a first housing 101. In the depicted example, there are four marking apparatuses 100, each of which is housed in a respective first housing 101. The first housings 101 may be dust tight and provide water protection against immersion of up to at least one meter.

For each marking apparatus 100, the device 120 comprises one base unit formed by a second housing 102 which accommodates a power supply and a cooling device for the respective marking apparatus 100. Each marking apparatus 100 is connected to its base unit 102 via an umbilical cable 50. The umbilical cables 50 are flexible and thus allow for flexibly positioning each marking apparatus 100 relative to the base units 102.

Additionally, a control unit 25 is provided in a control module 103, that is in a separate casing 103. The control unit 25 is connected to each of the base units 102 and is adapted to activate the marking apparatuses 100 via the base units 102 and the umbilical cables 50.

The cooling devices of the base units 102 each comprise a pump for pumping the cooling fluid. The cooling devices may be passive, i.e. no electrical energy is used for cooling. In this case cooling fluid heated by the lasers may be cooled down with a heat exchanger. In case of an active cooling device, the cooling fluid is additionally or alternatively cooled by using electrical power, e.g. with a thermoelectric element.

A marking apparatus with a particularly small design may thus be created. An efficient cooling is achieved with microchannels in which the cooling fluid flows with disruptions. Space requirements of the marking apparatus may be further reduced by removing the power supply, electronic components and/or the cooling device into a separate second housing such that the marking apparatus can be freely moved, e.g. with a motor, relative to the second housing. Furthermore, heat produced in the marking apparatus is led far away via the umbilical cable. Heat transfer from the cooling fluid to an environment does thus not warm the immediate surrounding of the marking apparatus. Cooling efficiency may thus be increased.

The invention claimed is:

1. A marking apparatus for marking an object with laser light, comprising:
   a plurality of gas lasers for emitting a plurality of laser beams for marking the object,
   wherein each gas laser comprises:
      a plurality of resonator tubes for receiving a laser gas, wherein each of the resonator tubes is arranged to at least partially surround an inner area, wherein the plurality of resonator tubes in each gas laser collectively form a closed loop surrounding the inner area,
   wherein the plurality of gas lasers are stacked on top of each other such that each resonator tube of one of the gas lasers in the plurality of gas lasers is aligned in parallel with one of the resonator tubes of another gas laser in the plurality of gas lasers, forming stacks of resonator tubes,
   wherein the plurality of gas lasers are configured to direct the plurality of laser beams to the inner area within the plurality of resonator tubes;
   a plurality of heat dissipaters for dissipating heat from the resonator tubes, wherein each one of the heat dissipaters is arranged next to one of the stacks of resonator tubes and is thermally connected to each of the stacks of resonator tubes,
   wherein the plurality of heat dissipaters are arranged along the closed loop formed by the plurality of resonator tubes;
   wherein each of the plurality of gas lasers is associated with an optical element comprising at least one mirror or at least one optical waveguide for directing a laser beam into the inner area surrounded by the closed loop of resonator tubes toward the object to be marked;
   wherein the at least one mirror or at least one optical waveguide is arranged in the inner area.

2. The marking apparatus according to claim 1, wherein for each resonator tube one electrode for exciting the laser gas received in the respective resonator tube is provided.

3. The marking apparatus according claim 1, further comprising:
   a control unit for individually activating each of the gas lasers to emit a laser beam according to a sign to be marked.

4. The marking apparatus according to claim 1, wherein each gas laser comprises connecting elements that connect adjacent resonator tubes of the respective gas laser to form a common tubular space, and the connecting elements of the gas lasers each comprise an inner cavity which is in fluidic communication with the at least two adjacent resonator tubes connected to the connecting element.

5. The marking apparatus of claim 1, further comprising
   a connector for connecting an umbilical cable for conducting a cooling fluid to and away from the marking apparatus, wherein the at least one gas laser is accommodated in a first housing, a pump is accommodated in a second housing, a heat rejecter for dissipating heat of the cooling fluid to an environment is provided in the second housing, and the first housing and the second housing are connected with the umbilical cable.

6. The marking apparatus of claim 1, wherein the at least one mirror or at least one optical waveguide is adjustable in its deflection direction.

* * * * *